United States Patent Office 3,395,087
Patented July 30, 1968

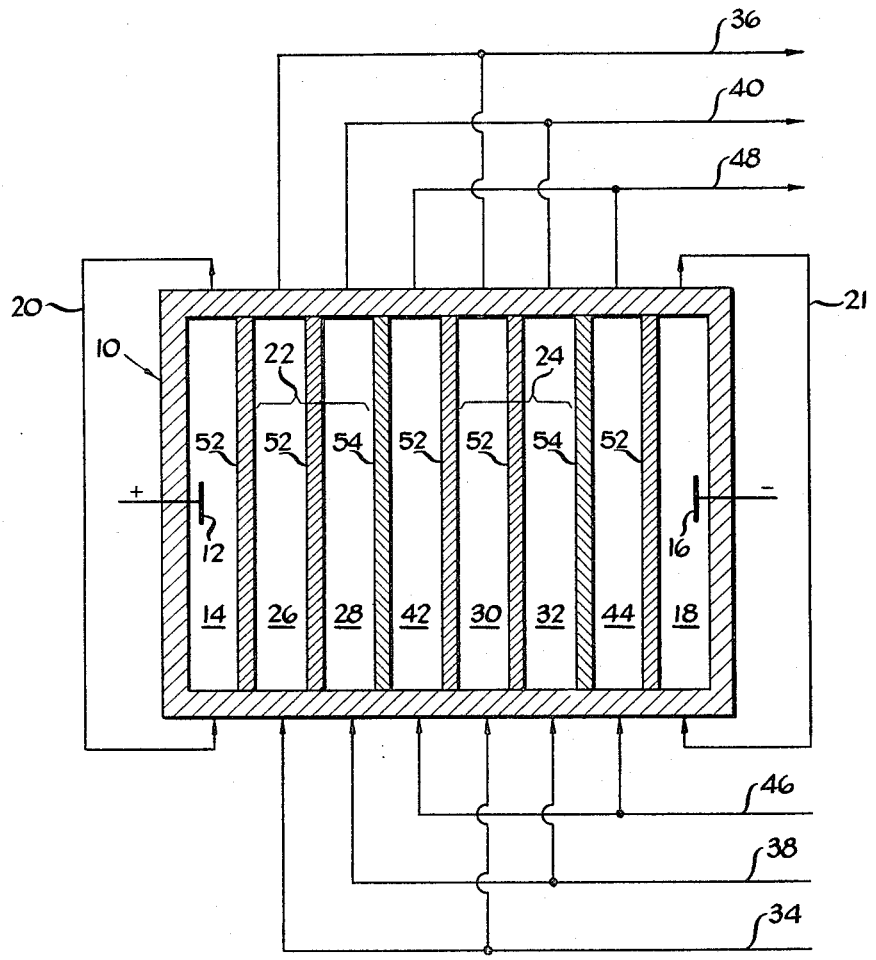

3,395,087
ELECTRODIALYSIS CELL
Thomas R. McElhinney, George A. Dubey, and Bernard F. Lueck, Appleton, Wis., assignors to Sulphite Products Corporation, Appleton, Wis., a corporation of Wisconsin
Filed June 9, 1964, Ser. No. 373,771
4 Claims. (Cl. 204—180)

ABSTRACT OF THE DISCLOSURE

Recovering low molecular weight cations by treating used pulping sulfite liquor by electrodialysis, utilizing sulfuric acid in one chamber as a source of hydrogen ions to displace sodium ion in the sulfite chamber. Liquid frames are bounded on each side by cation membranes; other frames are bounded by cation and anion membranes.

---

This invention relates generally to electrodialysis, and more particularly relates to an improved electrodialysis cell and to an improved method of treating a solution to separate cations therefrom.

Electrodialysis is a known electrochemical process for separating cations and/or anions from conductive solutions and includes the application of an electrical potential between a positively charged anode and a negatively charged cathode positioned within the conductive solution in an electrodialysis cell. The use of one or more electrodialysis membrances, either selective or non-selective, positioned between the anode and the cathode to provide desired separation of the anions and/or cations from one another in the cell, is generally known.

As used herein, a "frame" is defined as a compartment within an electrodialysis cell between two electrodialysis membranes, or between a membrane and an electrode, i.e., an anode or cathode. A "treating frame" for purposes of this disclosure is defined as a group of frames within which the cations and/or anions are separated from the solution being treated.

An electrodialysis cell may contain a single treating frame or may contain a plurality of treating frames, as may be desired. In this connection, it is generally known to provide an electrodialysis cell wherein there are a plurality of treating frames positioned between the anode and cathode. It is also known to provide an electrodialysis cell which includes a plurality of treating frames, and which also includes an additional frame, known as a barrier frame, disposed between adjacent treating frames. An electrodialysis cell of this type is disclosed in a copending application, Ser. No. 54,490, filed September 7, 1960, now Patent No. 3,136,710.

The membranes which form the boundaries of the various frames of electrodialysis cells may be selective or non-selective and are arranged within the cell in a desired manner for recovering a particular cation and/or anion. A selective membrane may be either anion selective or cation selective. An anion selective membrane will permit the passage of anions therethrough but will inhibit the passage of cations. Similarly, a cation selective membrane will permit the passage of cations but will inhibit the passage of anions. Generally, in known electrodialysis cells where the cell includes a plurality of treating frames, the membranes which form the various frames are alternately cation selective and anion selective. In some instances, one or more of the selective membranes have been replaced with a non-selective membrane.

Electrodialysis cells are well known for separating low molecular weight solutions, e.g., salt water. However, many electrodialysis cells are not suited for the ionic separation of solutions containing high molecular weight compounds, such as spent wood treating liquor, in a convenient and economical manner and at high current efficiency. A spent wood treating liquor is that solution resulting from the hydrolysis or pulping of wood. In this connection, spent sulfite liquor results from the pulping of wood in the presence of an acid cooking liquor. A conventional spent sulfite liquor includes lignosulfonate compounds varying in molecular weight, wood sugars and sugar derivatives, sulfur dioxide and a cation, e.g., sodium, potassium, calcium, magnesium or ammonium ions. The lignosulfonates and wood sugars are of relatively high molecular weight while the cations are of low molecular weight. It is desirable to recover the cations from the spent sulfite liquor in order that they can be reused in the preparation of additional cooking liquor and to provide a solution free from such cations.

It is a principal object of the present invention to provide improved means for effecting electrodialysis. A further object is to provide an improved electrodialysis cell and method for the separation of low molecular weight cations from a high molecular weight solution containing such ions. An additional object is to provide an electrodialysis cell for separating cations from spent wood treating liquors.

Other objects and advantages of the present invention will become apparent from the following detailed description and by reference to the accompanying drawing in which the single figure is a schematic drawing of an electrodialysis cell constructed in accordance with the present invention.

The present invention is directed to an improved electrodialysis cell which comprises an anolyte frame and a catholyte frame, at least two treating frames disposed between the anolyte and the catholyte frames and a barrier frame disposed between adjacent treating frames. Each treating frame includes a liquor frame and a cation concentrating frame. The liquor frame has cation selective membranes on each side thereof, and an anion selective membrane forms the boundary between the barrier frame and the cation concentrating frame. Further, in accordance with the present invention, an electrodialysis cell is provided which comprises a barrier frame positioned adjacent the catholyte frame.

The present invention is also directed to a method of recovering a low molecular weight cation from a high molecular weight solution containing the cation.

Now referring to FIGURE 1, there is shown a specific embodiment of an electrodialysis cell 10 constructed in accordance with the present invention. For purposes of explanation, the electrodialysis cell 10 is described in connection with the treatment of sodium base spent sulfite liquor to recover sodium ions therefrom and provide a liquor having a reduced sodium content. Alternately, the cell may advantageously be used to separate potassium, calcium, magnesium or ammonium ions from other spent sulfite liquors, or to separate low molecular weight cations from other spent liquors obtained from paper pulping processes, e.g., kraft liquors, liquors obtained in the processing of wood hydrolysates, or other high molecular weight solutions containing low molecular weight cations. Of course, it is apparent that the cell may be used for other electrodialysis processes which do not include separation of a low molecular weight cation from a high molecular weight solution.

The electrodialysis cell 10 includes an anode 12 positioned within an anolyte frame 14 at one end of the cell and a cathode 16 positioned within a catholyte frame 18 at the other end of the cell. A suitable electrolyte may be circulated through the anolyte frame 14 and the catholyte frame 18 through lines 20 and 21, respectively. In some instances, the anolyte and/or catholyte frame may also function as a frame within a treating frame.

Two treating frames, indicated by numerals 22 and 24, are positioned between the anolyte frame 14 and the catholyte frame 18. The treating frame 22 comprises a liquor frame 26 and a cation concentrating frame 28; and similarly, treating frame 24 comprises a liquor frame 30 and a cation concentrating frame 32. Sodium base spent sulfite liquor to be treated is introduced into the liquor frames 26 and 30 through line 34 and the effluent liquor, depleted of its sodium cations, is withdrawn from the liquor frames 26 and 30 through line 36.

A suitable cation concentrating solution which may be used in making up a pulping solution, such as a sodium sulfite solution, is passed into the cation concentrating frames 28 and 32 through line 38 and the solution, enriched in sodium ions, is withdrawn from the cation concentrating frames through line 40. It is apparent that other cation concentrating solutions may be utilized, depending upon the particular cation being recovered.

A barrier frame 42 is positioned between the treating frame 22 and the treating frame 24. In accordance with a specific embodiment of the invention, and as shown in the drawing, a barrier frame 44 is positioned intermediate the treating frame 24 and the catholyte frame 18. In some instances, barrier frame 44 may be eliminated. A suitable electrolyte is passed into the barrier frames 42 and 44 through line 46 and withdrawn from the barrier frames through line 48. The electrolyte introduced into the barrier frames should be highly conductive and desirably contain anions and cations which are not deleterious to the spent liquor and to the cation concentrating solution.

Each of the liquor frames, cation concentrating frames and barrier frames described above are bounded by selective electrodialysis membranes. Selective membranes, either anion selective or cation selective are commercially available. The particular arrangement of the anion selective and cation selective membranes within the electrodilysis cell 10 is considered to be an essential feature of the present invention. In this connection, the liquor frames 26 and 30 are bounded on both sides thereof by cation selective membranes 52. An anion selective membrane 54 forms the boundary between the barrier frame 42 and the cation concentrating frame 28. By the above selection and arrangement of selective membranes, low molecular weight cations may be efficiently separated from a solution containing such cations in admixture with relatively high molecular weight anions. In this connection, it was heretofore considered to be advantageous to separate the barrier frame from the liquor frame by one or more anion concentrating frames. The anion concentrating frames were generally bounded by non-selective membranes and were employed to separate various molecular weight anion fractions. However, it has been discovered that the anion concentrating frames may be eliminated from the cell, with a corresponding decrease in current consumption.

The elimination of the anion concentrating frames results in a novel electrodialysis cell wherein certain adjacent membranes within the cell are cation selective membranes. The arrangement of the membranes, together with the use of barrier frames between adjacent treating frames, provides an electrodialysis cell that is particularly suited for the separation of low molecular weight cations from a solution containing high molecular weight anions. Further, the electrodialysis cell provides substantially all of the anions in a single effluent stream, which for disposal purposes, e.g., in the electrodialysis of wood treating liquors, is advantageous.

In operation, the sodium base spent sulfite liquor containing sodium lignosulfonates, wood sugars, and other high molecular weight constituents of spent sulfite liquor are introduced into the liquor frame 26. The passage of an electric current between the anode 12 and the cathode 16 causes the sodium cations to migrate toward the cathode 16 and the anionic derivatives of lignin and wood sugars and various other anions to migrate toward the anode 12.

The cation selective membrane 52 which forms the boundary between the liquor frame 26 and the cation concentrating frame 28 allows the sodium ions to pass from the liquor frame 26 through the cation selective membrane 52 into the cation concentrating frame 28, but substantially prevents passage of the anionic derivatives of lignin and wood sugars and various other anions into the cation concentrating frame 28. The provision of a cation selective membrane as the boundary between the liquor frame 26 and the anolyte frame 14 prevents the anionic derivatives of lignin and wood sugars and various other anions from migrating toward the anode. Thus the treated liquor obtained from the cell is depleted of sodium ions but contains all of the anionic derivatives of lignin and wood sugars and various other anions.

The provision of an anion selective membrane 54 as the boundary between the cation concentrating frame 28 and the barriers frame 42 substantially prevents the passage of the sodium ions present in the cation concentrating frame 28 into barrier frame 42. Thus, the cations which pass into the cation concentrating frame 28 from the liquor frame 26 through the cation selective membrane 52 are concentrated in the cation concentrating frame 28 and are removed from the cell in the cation concentrating solution.

A suitable electrolyte, e.g., dilute sulfurous acid, is passed into the barrier frame 42 through line 46. Alternately, other dilute acidic solutions, e.g., sulfuric acid or acetic acid may be employed. The bi-sulfite anion present in the sulfurous acid passes out of the barrier frame 42 through the anion selective membrane 54 into the cation concentrating frame 28; and the hydrogen cations pass out of the barrier frame 42 and into the liquor frame 30 through the cation selective membrane 52.

It can be seen that the electrolyte which is introduced into the barrier frame may be selected so that a preferred compound may be recovered from the cation concentrating frame 28. When sodium ions are recovered from a sodium base spent sulfite liquor, and sulfurous acid is employed as a barrier solution, the cation concentrating solution which passes out of the cation concentrating frame 28 through line 40 has an increased concentration of sodium sulfite which may be employed in preparation of a sulfite pulp digesting solution.

The recovery of sodium ions from a sodium base spent sulfite liquor in treating frame 24, or in any other treating frame, is carried out substantially identically to that described above with respect to treating frame 22. A cation concentrating solution which is enriched in sodium ions is withdrawn from each of the cation concentrating frames.

Referring again to FIGURE 1, in a preferred embodiment of the present invention, a barrier frame 44 is positioned adjacent the catholyte frame 18. It has been found that when the frame adjacent the catholyte frame is a barrier frame, the internal resistance, heating, and power consumption of the electrodialysis cell are substantially reduced. In this connection, the internal resistance of the cell may be reduced by as much as 50 percent depending on the number of treating frames and the particular liquor being processed. As used herein, the term "barrier frame" is intended to mean a frame through which an electrolyte other than the liquor being treated or the cation concentrating solution is passed. Generally, a dilute acid is employed as the barrier frame electrolyte.

It has been discovered that the provision of a barrier frame adjacent the catholyte frame is particularly advantageous where the cation being concentrated is a less soluble divalent cation, e.g., calcium and magnesium. For example, when the liquor being electrodialyzed is a spent sulfite liquor, the provision of a barrier frame adjacent the catholyte frame allows the magnesium or calcium cations to be maintained in the more soluble bisulfite form.

The substantial improvement obtained by the positioning of a barrier frame adjacent the catholyte frame may be achieved in any electrodialysis cell which employs barrier frames, and is not limited to cells which include the particular arrangement of membranes disclosed herein. In this connection, the positioning of a barrier frame adjacent the catholyte frame in an electrodialysis cell of the type described in co-pending Ser. No. 54,490, filed Sept. 7, 1960, now U.S. Patent No. 3,136,710 also results in improved cell power efficiency, and the ability to more readily separate the less soluble divalent cations.

The exact mechanism whereby the resistance of the electrodialysis cell is reduced when a barrier frame is positioned adjacent the cathode is not altogether understood. The result was wholly unexpected and unanticipated and, in any event, the increased operating efficiency of the cell was beyond any expectancy. The lower cell resistance that is obtained when a barrier frame is positioned adjacent the catholyte frame is reproducible, regardless of the internal structure and arrangement of membranes within the electrodialysis cell.

EXAMPLE I

In a specific example of the operation of an electrodialysis cell of the present invention, sodium ions are recovered from sodium base neutral sulfite spent liquor. The sodium spent sulfite liquor contained 17.6 percent solids and had a sodium content of 32.0 grams per liter. The spent sulfite liquor contained 10.0 percent of ligneous material and salts of volatile organic acids (acetic and formic) having molecular weights ranging between about 70 and 300,000.

The sodium base neutral sulfite spent liquor was treated in an electrodialysis cell containing four treating frames. Each treating frame included a liquor frame, bounded on each side by a cation selective membrane, and a cation concentrating frame. A barrier frame was interposed between adjacent treating frames and the frame adjacent the catholyte frame was a cation concentrating frame. An anion selective membrane formed the boundary between each barrier frame and the respective cation concentrating frame. The cation selective membranes through which the sodium ions passed had a total surface area of 2880 square centimeters.

A dilute aqueous sodium sulfite cation concentrating solution containing 0.07 gram of sodium per liter was passed through each of the cation concentrating frames and an 0.9 percent aqueous sulfurous acid solution was passed through each of the barrier frames. The solutions were circulated through the respective frames at a temperature of 25° C and at a rate sufficient to establish turbulence within the frames. The spent sulfiate liquor, at a temperature of 25° C., was passed through the liquor frames four times, and the residence time of the spent sulfite liquor within the electrodialysis cell averaged about 1 minute per pass.

An electric potential was established between the anode and cathode of the electrodialysis cell sufficient to establish a current density within the cell of 83 milliamperes per square centimeter of membrane area.

At the end of the treatment the concentration of sodium ions in the spent sulfite liquor was 15.3 grams per liter and the concentration of sodium ions in the cation concentrating solution was 14.7 grams per liter. The current efficiency achieved was 98 percent and the internal cell resistance was 0.6–0.8 ohm.

EXAMPLE II

Sodium ions were separated from a sodium base spent sulfite liquor in a cell similar to that employed in Example I, which cell was modified so that the frame adjacent the catholyte frame was a barrier frame. In all other respects, the treatment was identical with Example I. The sodium concentration in the spent sulfite liquor prior to treatment was 32.0 grams per liter, and after treatment was 14.8 grams per liter. The cation concentration solution contained 0.46 gram per liter of sodium prior to treatment and 15.9 grams per liter of sodium after the treatment was terminated. The current efficiency of the cell during the treatment was 99 percent and the internal cell resistance was 0.6–0.8 ohm.

EXAMPLE III

Sodium ions were recovered from a sodium base neutral sulfite spent liquor in an electrodialysis cell containing 6 treating frames, each treating frame including a liquor frame, cation concentrating frame and an anion concentrating frame such as disclosed in aforementioned U.S. Patent No. 3,136,710. A barrier frame was interposed between adjacent treating frames, and the frame adjacent the catholyte frame was a cation concentrating frame. The cation selective membrane through which the wanted sodium ions passed had a total surface area of 15,840 square centimeters.

The sodium spent sulfite liquor contained 100 grams of sodium per liter. 140 liters of the spent sulfite liquor was recirculated through the electrodialysis cell at a flow rate of 1.8 gallons per minute.

The current density was 85 milliamperes per square centimeter and the internal resistance of the electrodialysis cell was 0.31 ohm. The temperature of the various recirculated streams increased about 10° C. per hour.

EXAMPLE IV

Sodium ions were separated from a sodium base spent sulfite liquor containing 93 grams of sodium per liter in the electrodialysis cell described in Example III, except that a barrier frame was positioned adjacent the catholyte frame. The spent sufite solution was recycled through the electrodialysis cell at a flow rate of 1.3 gallons per minute.

The current density was 85 milliamperes per square centimeter and the internal resistance of the electrodialysis cell was 0.27 ohm. The temperature of the recirculated streams increased 4° C. per hour.

EXAMPLE V

A calcium base spent sulfite liquor containing 26 grams of calcium per liter was treated in an electrodialysis cell similar to that set forth in Example 3 except that the cell contained 2 treating frames instead of 6 treating frames. The total area of the cation selective membranes through which the desired calcium ions were passed was 5280 square centimeters. The frame adjacent the catholyte frame was a cation concentrating frame. 140 liters of the calcium base liquor was recirculated through the electrodialysis cell at a flow rate of 0.1 gallon per minute.

The current density was 38 milliamperes per square centimeter and the internal resistance of the cell was 0.27 ohms. The temperature of the recirculated streams increased from 3° C. to 4° C. per hour.

EXAMPLE VI

A further amount of the calcium base spent sulfite liquor of Example V was electrodialyzed in an electrodialysis cell similar to that set forth in Example V except that a barrier frame was positioned adjacent the catholyte frame. The current density was 38 milliamperes per square centimeter and the internal resistance of the cell was 0.15 ohm. The increase in temperature of the recirculated streams was less than 1° C. per hour.

It can be seen that an electrodialysis cell has been described which provides a convenient method for separating low molecular weight cations from a high molecular weight solution. A specific arrangement of selective membranes has been disclosed which allows such a separation of cations from a high molecular weight solution at a lower power useage. A particular electrodialysis cell structure has also been disclosed wherein a barrier frame is positioned adjacent the catholyte frame in order to reduce the internal resistance of the electrodialysis cell thereby providing improved power efficiency.

It is understood that any number of treating frames may be utilized in an electrodialysis cell constructed in accordance with the present invention. Although certain of the features of the invention have been set forth with particularity in order to accurately describe the invention, other embodiments are contemplated as within the skill of the art.

Various of the features of the invention are set forth in the following claims.

What is claimed is:

1. A method for the recovery of a low molecular weight cation from an ionizable liquor resulting from the pulping of wood, comprising the steps of providing in successive zones in an electrodialysis cell an ionizable barrier solution, the pulping liquor, and an ionizable solution in which the cation is to be recovered, positioning a selectively cation-permeable membrane between the barrier solution and the pulping liquor, positioning another selectively cation-permeable membrane between the pulping liquor and the ionizable solution in which the cation is to be recovered, positioning a selectively anion-permeable membrane on the other side of the ionizable solution in which the cation is to be recovered, and establishing a direct current electrical potential across the solutions to thereby enable recovery of the cation.

2. The method of claim 1 wherein the liquor from which the low molecular weight cation is recovered is spent sulfite liquor.

3. A method for the recovery of a low molecular weight cation from an ionizable liquor resulting from the pulping of wood, comprising the steps of providing in an electrodialysis cell at least two sets of successive zones comprising a first zone containing the pulping liquor and a second zone containing an ionizable solution in which the cation is to be recovered, providing an ionizable barrier solution between the sets of zones, positioning selectively cation-permeable membranes on both sides of the zones containing the pulping liquor, positioning a selectively anion-permeable membrane between the zone containing the ionizable solution in which the cation is to be recovered and the barrier solution, and establishing a direct current electrical potential across the solutions to thereby enable recovery of the cation.

4. The method of claim 3 in which the liquor from which the low molecular weight cation is recovered is spent sulfite liquor.

References Cited

UNITED STATES PATENTS

| | | | |
|---|---|---|---|
| 2,694,680 | 11/1954 | Katz et al. | 204—180 |
| 2,921,005 | 1/1960 | Bodamer | 204—180 X |
| 3,136,710 | 6/1964 | Dubey | 204—180 |

FOREIGN PATENTS 372,018  12/1957  Japan.

JOHN H. MACK, *Primary Examiner.*

A. C. PRESCOTT, *Assistant Examiner.*